(12) United States Patent
Hayashi et al.

(10) Patent No.: US 11,650,636 B2
(45) Date of Patent: May 16, 2023

(54) STORAGE DEVICE ATTACHMENT AND DETACHMENT STRUCTURE AND DISPLAY DEVICE

(71) Applicant: Funai Electric Co., Ltd., Osaka (JP)

(72) Inventors: Takumi Hayashi, Osaka (JP); Daisuke Ogawa, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 47 days.

(21) Appl. No.: 17/320,928

(22) Filed: May 14, 2021

(65) Prior Publication Data

US 2021/0382531 A1    Dec. 9, 2021

(30) Foreign Application Priority Data

Jun. 4, 2020 (JP) .............................. JP2020-097413

(51) Int. Cl.
| | |
|---|---|
| G11B 33/00 | (2006.01) |
| G06F 1/18 | (2006.01) |
| G06F 1/16 | (2006.01) |
| G11B 33/12 | (2006.01) |

(52) U.S. Cl.
CPC ............ G06F 1/187 (2013.01); G06F 1/1601 (2013.01); G11B 33/124 (2013.01)

(58) Field of Classification Search
CPC .......... G06F 1/183; G06F 1/185; G06F 1/186; G06F 1/187; G06F 1/1656; G06F 1/1658; G11B 33/005; G11B 33/02; G11B 33/022; G11B 33/025; G11B 33/123; G11B 33/124; H05K 5/0256; H05K 5/026; H05K 5/0286; H05K 7/1408; H05K 7/1405; H05K 7/1404; H01R 12/721; F16B 2/248; H01L 23/4093; H01L 23/40; Y10T 24/44; Y10T 24/44026; A61B 17/1227
USPC ..................................................... 361/679.37
See application file for complete search history.

(56) References Cited

U.S. PATENT DOCUMENTS

| | | | |
|---|---|---|---|
| 4,786,256 A * | 11/1988 | Angeleri .............. | H05K 7/1023 439/72 |
| 6,040,980 A * | 3/2000 | Johnson ............... | G11B 33/124 361/728 |
| 6,707,672 B2 * | 3/2004 | Liu ..................... | H01L 23/4006 165/185 |

(Continued)

FOREIGN PATENT DOCUMENTS

| | | |
|---|---|---|
| JP | 2008-171460 A | 7/2008 |
| JP | 2010-186514 A | 8/2010 |

*Primary Examiner* — Adrian S Wilson
*Assistant Examiner* — Gage Crum
(74) *Attorney, Agent, or Firm* — Global IP Counselors, LLP

(57) ABSTRACT

A storage device attachment and detachment structure comprising a holding member configured to hold a storage device with a storage medium, and a pressure member including a biasing portion that has an end portion connected to the holding member, the biasing portion being configured to contact the storage device to press the storage device in a biasing direction toward the holding member, the pressure member being movable to a pressure release position in which the pressure member is separated from the storage device in an opposite direction of the biasing direction to release pressure relative to the storage device.

18 Claims, 6 Drawing Sheets

(56) References Cited

U.S. PATENT DOCUMENTS

| | | | | |
|---|---|---|---|---|
| 7,134,896 | B1 * | 11/2006 | Chen | H05K 7/1404 |
| | | | | 439/326 |
| 7,241,159 | B1 * | 7/2007 | Chen | H01R 13/26 |
| | | | | 439/92 |
| 7,470,136 | B2 * | 12/2008 | Yahiro | H01R 13/6275 |
| | | | | 439/326 |
| 9,552,024 | B2 * | 1/2017 | Lin | G06F 1/187 |
| 9,823,713 | B2 * | 11/2017 | Chen | G11B 33/124 |
| 2005/0263264 | A1 * | 12/2005 | Chen | H01L 23/4093 |
| | | | | 165/80.2 |
| 2007/0105419 | A1 * | 5/2007 | Chen | G11B 33/12 |
| | | | | 439/138 |
| 2008/0165491 | A1 | 7/2008 | Iwaasa | |
| 2009/0040699 | A1 * | 2/2009 | Tanaka | G06F 1/187 |
| | | | | 361/679.09 |
| 2009/0279242 | A1 * | 11/2009 | Yang | G06F 1/187 |
| | | | | 361/679.31 |
| 2010/0202274 | A1 | 8/2010 | Kaneko et al. | |
| 2013/0003289 | A1 * | 1/2013 | Sun | G06F 1/187 |
| | | | | 361/679.33 |
| 2013/0017718 | A1 * | 1/2013 | Lin | G06F 1/185 |
| | | | | 439/534 |
| 2013/0201626 | A1 * | 8/2013 | Bondurant | G06F 1/1658 |
| | | | | 248/221.11 |
| 2014/0078665 | A1 * | 3/2014 | Yu | G11B 33/124 |
| | | | | 361/679.33 |
| 2017/0020018 | A1 | 1/2017 | Chen et al. | |

\* cited by examiner

STORAGE DEVICE ATTACHMENT AND DETACHMENT STRUCTURE AND DISPLAY DEVICE

CROSS-REFERENCE TO RELATED APPLICATIONS

This application claims priority to Japanese Patent Application No. 2020-097413 filed on Jun. 4, 2020. The entire disclosure of Japanese Patent Application No. 2020-097413 is hereby incorporated herein by reference.

BACKGROUND

Field of the Invention

The present invention generally relates to a storage device attachment and detachment structure and a display device. More specifically, the present invention relates to a storage device attachment and detachment structure and a display device equipped with a holding member and a pressure member.

Background Information

Some recording and reproducing apparatuses are equipped with a structure in which a hard disk drive (HDD) unit is mounted on an HDD holder (see Japanese Laid-Open Patent Application Publication No. 2008-171460 (Patent Literature 1), for example). The recording and reproducing apparatus described in Patent Literature 1 above has a structure in which an attachment piece of an HDD unit is pinched by dampers and fixed to the HDD holder using screw members. However, in the recording and reproducing apparatus described in Patent Literature 1 above, when replacing the HDD unit, it is necessary to remove and tighten the screw members using a screwdriver or other tool. As a result, the replacement process is time-consuming and labor-intensive.

To solve this problem, a structure has been proposed that can reduce the time and labor required for replacement of a hard disk drive by eliminating the need for removal and tightening of screw members (see Japanese Laid-Open Patent Application Publication No. 2010-186514 (Patent Literature 2), for example). An information processing apparatus described in Patent Literature 2 above has a structure in which a leaf spring provided inside a main body housing of the information processing device presses the hard disk drive against a hard disk drive housing from above. The main body housing of the information processing apparatus is equipped with an interfering member. The bottom of the hard disk drive has a lock lever that interferes with the interfering member. When the hard disk drive is removed from the information processing apparatus, the lock lever is pulled, and the lock lever climbs over the interfering member. As a result, the lock by the lock lever is released, and the hard disk drive can be removed from the information processing apparatus. The information processing apparatus described in Patent Literature 2 above has an anti-vibration rubber sandwiched between the bottom of the hard disk drive and the bottom of the hard disk drive housing.

SUMMARY

However, the leaf spring proposed in Patent Literature 2 above only presses the hard disk drive from above, and the leaf spring itself cannot release the fixation of the hard disk drive. Therefore, as described above, the information processing device described in Patent Literature 2 requires separate components, such as the lock lever and the interfering member, for releasing the fixation of and detaching the hard disk drive when the hard disk drive is replaced. As a result, there is a problem that the number of parts increases.

One object is to provide a storage device attachment and detachment structure and a display device that can reduce the time and labor required for replacing a storage device, and that can suppress the increase in the number of parts.

In view of the state of the known technology and in accordance with a first aspect of the present invention, a storage device attachment and detachment structure comprises a holding member configured to hold a storage device with a storage medium, and a pressure member including a biasing portion that has an end portion connected to the holding member, the pressure member being configured to contact the storage device to press the storage device in a biasing direction toward the holding member, the pressure member being movable to a pressure release position in which the pressure member is separated from the storage device in an opposite direction of the biasing direction to release pressure relative to the storage device.

BRIEF DESCRIPTION OF THE DRAWINGS

Referring now to the attached drawings which form a part of this original disclosure.

DETAILED DESCRIPTION OF EMBODIMENTS

Figure 1:
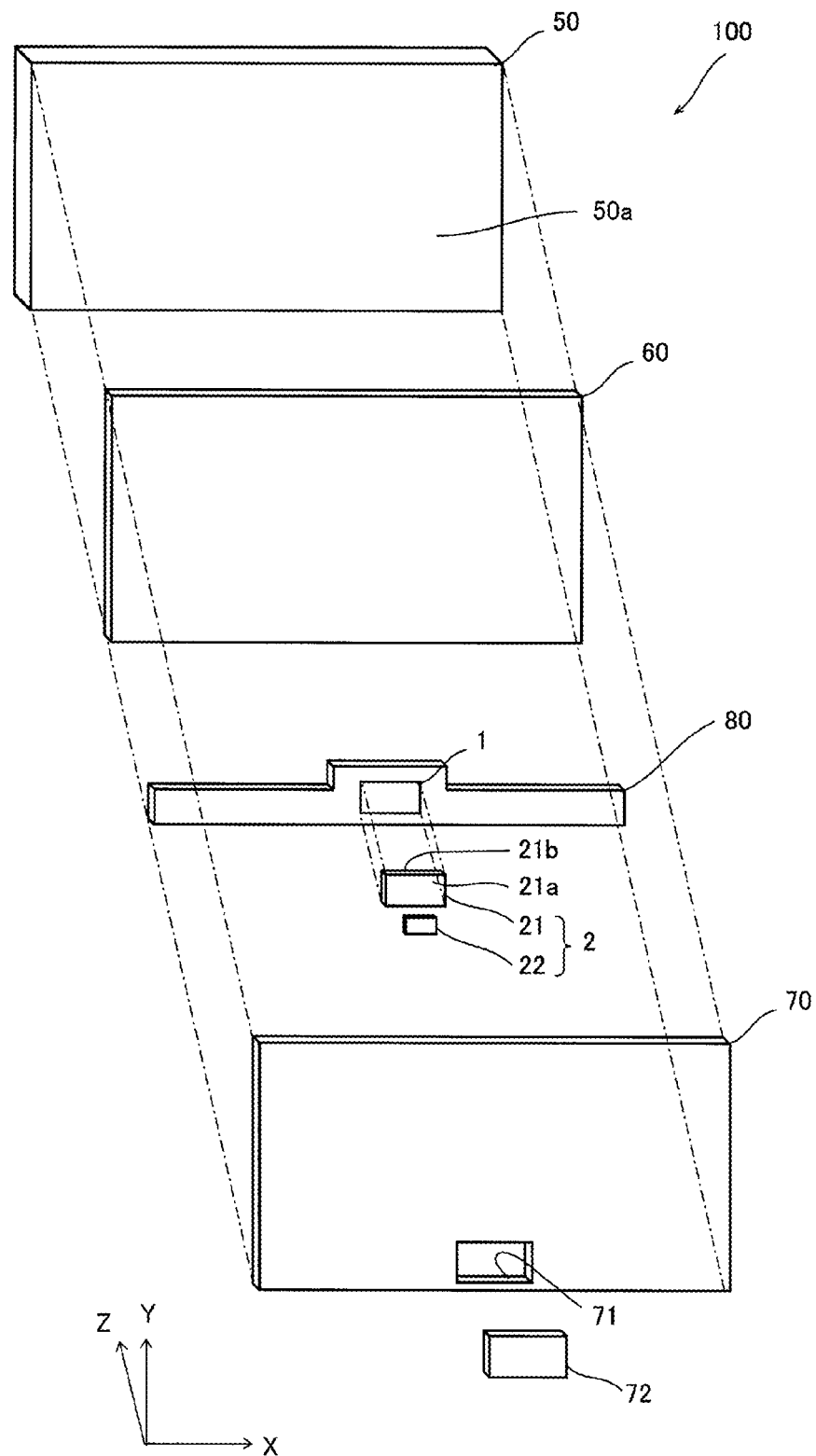
FIG. 1 is an exploded perspective view of a display device in accordance with a first embodiment, illustrating a rear frame, a bottom cover, a rear cover and a storage device in the display device.

Selected embodiments will now be explained with reference to the drawings. It will be apparent to those skilled in the display device field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

First Embodiment (Configuration of Display Device with Attachment and Detachment Structure of Storage Device)

With reference to FIGS. 1 to 5, the configuration of a display device 100 including an attachment and detachment structure 1 (e.g., a storage device attachment and detachment structure) of a storage device 2 according to a first embodiment will be described. In the present disclosure, the left and right direction as viewed from a front surface side of the display device 100 including the attachment and detachment structure 1 of the storage device 2 is referred to as an X direction. The vertical direction as viewed from the front surface side of the display device 100 is referred to as a Y direction. The direction connecting a back surface side and the front surface side of the display unit 100 (e.g., the front to back direction) is referred to as a Z direction. In the illustrated embodiment, the attachment and detachment structure 1 of the storage device 2 is a toolless attachment and detachment structure for toollessly attaching or detaching the storage device 2 to the display device 100. Thus, the storage device 2 can be replaced without using screws or other fastener that require tools for fastening.

As shown in FIG. 1, the display device 100 including the attachment and detachment structure 1 of the storage device 2 according to the first embodiment has a display 50, a rear frame 60, a rear cover 70, and a bottom cover 80. The bottom cover 80 is provided with the attachment and detachment structure 1 of the storage device 2 that is attach and detach the storage device 2 having a storage medium 22. FIG. 1 shows an exploded perspective view of the display device 100 as viewed from the back surface side.

The display 50 is disposed at a frontmost side of the display device 100. The display 50 is, for example, a liquid crystal panel. However, the display 50 can be different types of display panels, such as an OLED (organic light-emitting diode) panel.

The rear frame 60 is arranged to cover the back surface side 50a of the display 50. The rear frame 60 is made, for example, of a metal plate.

The rear cover 70 is arranged to cover the rear frame 60. The rear cover 70 is disposed on a surface of the rear frame 60 facing opposite to the display 50. The rear cover 70 is made of resin, for example. The rear cover 70 has an opening 71 at a portion of the rear cover 70 that faces the attachment and detachment structure 1 of the storage device 2 that is provided to the bottom cover 80, as described later. The opening 71 of the rear cover 70 is formed so that the attachment and detachment structure 1 of the storage device 2 is exposed. An opening cover 72 is attached to the rear cover 70 to cover the opening 71 that exposes the attachment and detachment structure 1 of the storage device 2. The opening cover 72 is removed when the storage device 2 held by a holding member or holder 12, described later, of the bottom cover 80 is detached.

The bottom cover 80 is disposed at the bottom of the surface of the rear frame 60 facing opposite to the display 50 on the rear cover 70 side. The bottom cover 80 is arranged to be sandwiched between the rear frame 60 and the rear cover 70. The bottom cover 80 is a member integrally formed along a lower part of the rear frame 60 in the left and right direction (the X direction). The bottom cover 80 is made of resin, for example. In the center of the bottom cover 80 on the rear cover 70 side, the attachment and detachment structure 1 of the storage device 2 is provided (see FIG. 2).

Figure 2:
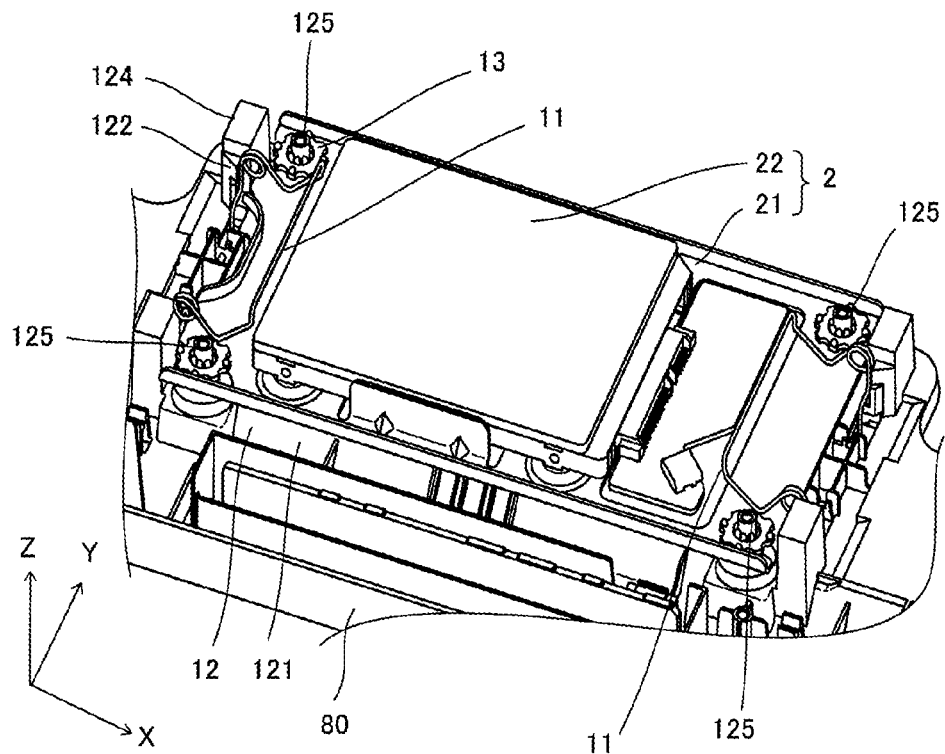
FIG. 2 is a perspective view of an attachment and detachment structure of the storage device in accordance with the first embodiment.

FIG. 2 shows a perspective view of the attachment and detachment structure 1 of the storage device 2, illustrating an attachment state in which the storage device 2 is pressed and fixed to the holding member 12. As shown in FIG. 2, the storage device 2 includes a plate member 21 and a storage medium 22. The plate member 21 is made, for example, of a metal plate. The plate member 21 is, for example, rectangular in plan view. Holes or cutouts (not shown) are formed in the four corners of the plate member 21 through which shaft portions 125 formed in the holding member 12, described later, are insertable. In the present disclosure, the holes or cutouts formed in the plate member 21 are referred to as "holes". The diameter of the holes through which the shaft portions 125 are insertable is larger than the diameter of the shaft portions 125 in order to suppress direct transmission of vibrations from the display device 100 to the storage device 2 via the shaft portions 125 and the plate member 21. The storage medium 22 is fixedly attached to one surface 21a (see FIG. 1) of the plate member 21. The storage medium 22 includes, for example, a hard disk drive (HDD). Thus, the storage device 2 can also be referred to as a hard disk drive unit, for example. However, the storage medium 22 can be different types of disk storage medium, or can be different types of memory or storage medium, such as solid state drive (SSD). In plan view, the outer shape of the plate member 21 is formed larger than the outer shape of the storage medium 22. The storage device 2 is attachably and detachably (or removably) attached to the attachment and detachment structure 1 of the storage device 2 so that a surface 21b opposite to the one surface 21a of the plate member 21 faces the bottom cover 80 (see FIG. 1).

As shown in FIG. 2, the attachment and detachment structure 1 of the storage device 2 includes a pair of pressure members 11 that press the storage device 2 and the holding member 12 that holds the storage device 2. The attachment and detachment structure 1 of the storage device 2 also includes a first buffer member 13. Specifically, in the illustrated embodiment, the pressure members 11 are clips that hold the storage device 2 against the holding member 12.

Figure 3:
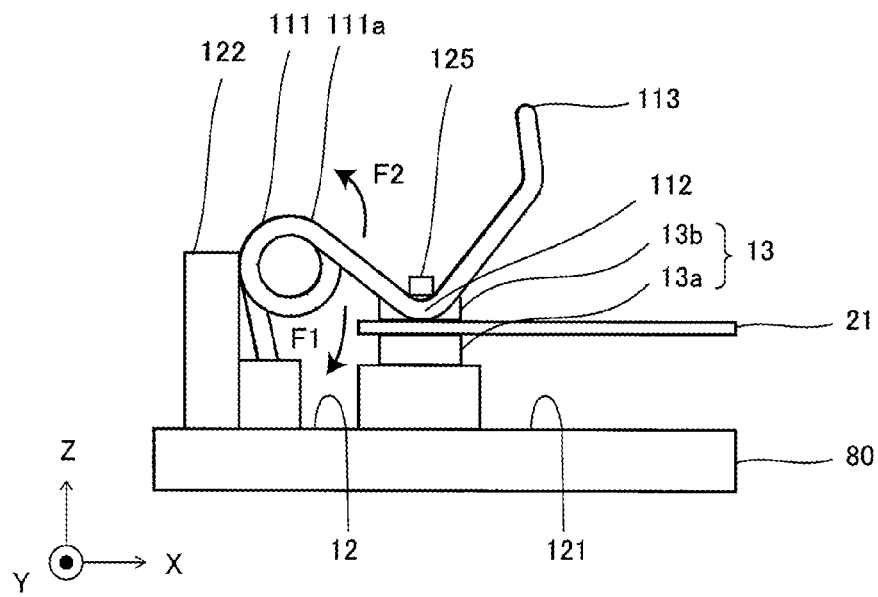
FIG. 3 is a side schematic view of a pressure member of the attachment and detachment structure in accordance with the first embodiment.
Figure 4:
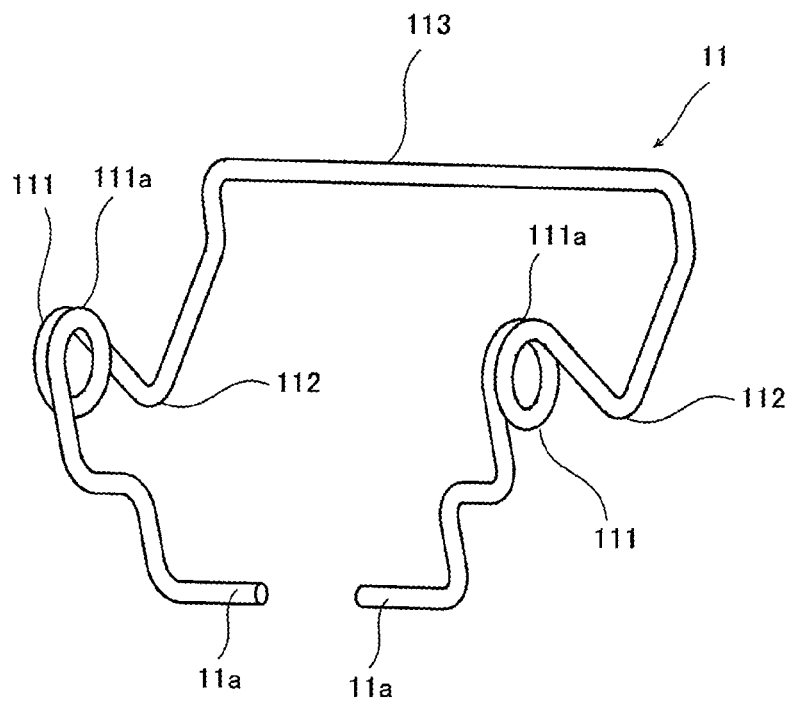
FIG. 4 is a perspective view of the pressure member in accordance with the first embodiment.

As shown in FIGS. 2 to 4, the pressure members 11 each includes a pair of biasing portions 111, a pair of contacting portions 112, and a connecting portion 113. The pressure members 11 are attached to the holding member 12 movably at least between a biasing position or orientation (see FIG. 6) and a pressure release position or orientation P (see FIG. 7). Specifically, the pressure members 11 are configured to release the pressure relative to the storage device 2 by being toollessly moved from the biasing position to the pressure release position P. The pressure members 11 press or biases the storage device 2 toward the holding member 12 in a biasing direction F1 (see FIG. 3) when the pressure members 11 are located at the biasing position. On the other hand, the pressure members 11 are separated from the storage device 2 in an opposite direction of the biasing direction F1 to release the pressure relative to the storage device 2 when the pressure members are located at the pressure release position P. The pressure members 11 are formed near both end portions of a rectangular mounting portion 121 (see FIG. 2), which will be described later, of the holding member 12 in the X direction, respectively. The pressure members 11 are each integrally formed as a one-piece, unitary member by metal wire, such as stainless steel wire, for example. The diameter of the stainless steel wire that forms the pressure members 11 is, for example, 1.5 mm. Of course, the pressure members 11 can be made of any other suitable material, such as non-metal material, suitable for exerting the biasing force to hold the storage device 2.

As shown in FIG. 3, the biasing portions 111 bias the storage device 2 in the biasing direction F1 so as to press the storage device 2 toward the holding member 12. The biasing portions 111 are each formed by, for example, a torsion coil spring that is capable of providing a biasing force that biases corresponding one of the contacting portions 112 toward the holding member 12. Thus, the pressure members 11 each includes the pair of biasing portions 111 having a pair of torsion coil spring parts 111a. One ends (e.g., end portions) of the pair of biasing portions 111 are engaged with engagement portions 123 (see FIG. 5) of the holding member 12, respectively. The other ends of the pair of biasing portions 111 are connected to the contacting portions 112, respectively. Thus, the one ends of the biasing portions 111 form a pair of free end portions 11a of the pressure members 11.

Figure 6:
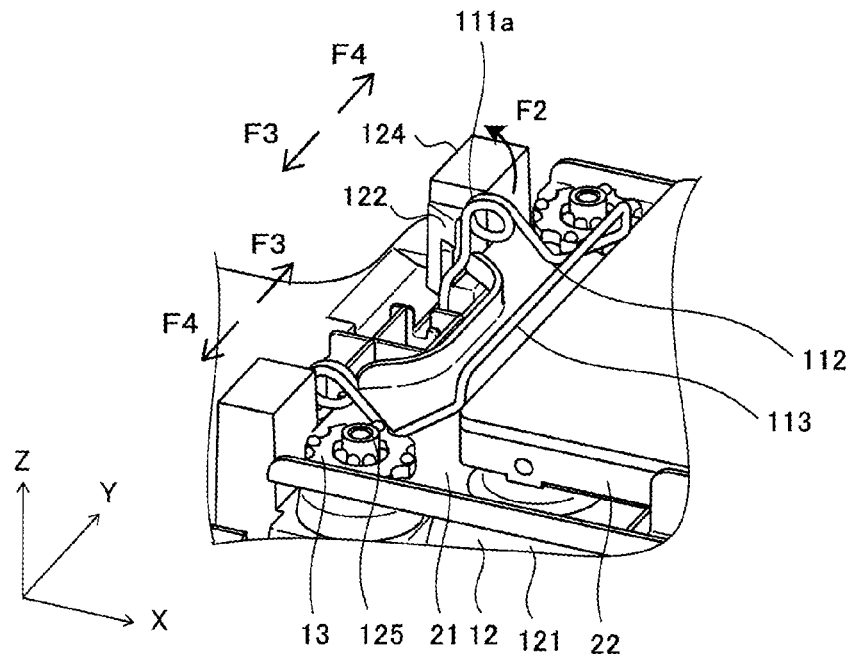
FIG. 6 is a partial perspective view of the attachment and detachment structure in accordance with the first embodiment, illustrating an attachment state in which the storage device is pressed and fixed to the holding member.

The contacting portions 112 contact the storage device 2 to press the storage device 2 toward the holding member 12 by the biasing force by the biasing portions 111. In the illustrated embodiment, the contacting portions 112 contact the plate member 21 of the storage device 2 when the storage device 2 is attached to the holding member 12. The contacting portions 112 each have a U-shaped bend shape that is convex toward the holding member 12, for example. The pressure members 11 each include the pair of contacting portions 112. One ends (see FIG. 4) of the pair of contacting portions 112 are connected to the other ends of the pair of torsion coil spring parts 111a, respectively. The other ends of the pair of contacting portions 112 are connected to each other via the connecting portion 113. In the illustrated embodiment, as shown in FIG. 6, the contacting portions 112 of each of the pressure members 11 directly contact the plate member 21 of the storage device 2 at different contact locations spaced apart from each other in the Y direction. In the illustrated embodiment, these contact locations are both disposed between the shaft portions 125 in the Y direction.

The connecting portion 113 connects the pair of contacting portions 112 together.

Figure 5:
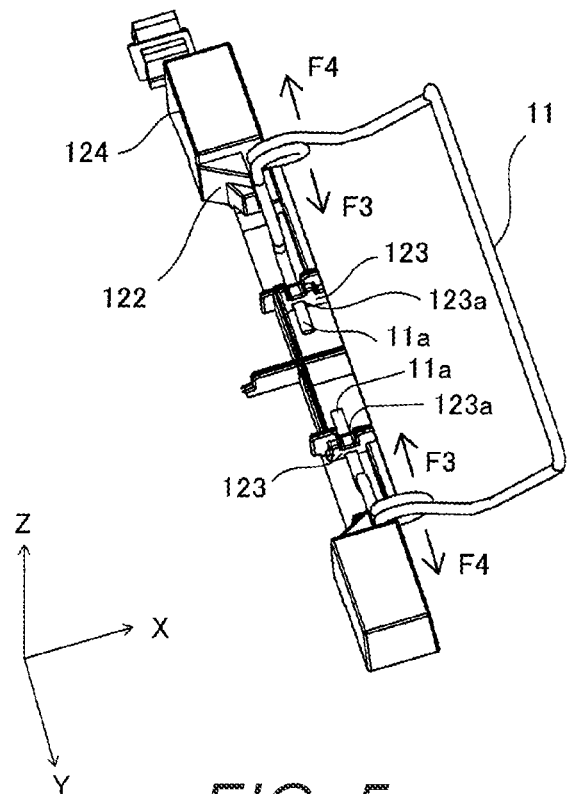
FIG. 5 is a partial perspective view of the attachment and detachment structure in accordance with the first embodiment, illustrating an engagement state between the pressure member and an engagement portion of a holding member of the attachment and detachment structure.

As shown in FIGS. 2 and 5, the holding member 12 has the mounting portion 121, a plurality of restriction portions 122, the engagement portions 123, a plurality of engagement release restriction portions 124, and the shaft portions 125. The holding member 12 holds the storage device 2. The holding member 12 is a part of the bottom cover 80. The holding member 12 is integrally formed with the bottom cover 80 as a one-piece, unitary member. Thus, the holding member 12 is also made of resin, for example, as well as the bottom cover 80.

The mounting portion 121 has a rectangular shape in plan view. The mounting portion 121 places the storage device 2 in a state in which the storage device 2 is attached by the attachment and detachment structure 1 of the storage device 2.

The restriction portions 122 are provided corresponding to each of the pressure members 11 as a pair of convex portions having a shape that is convex toward the rear cover 70 in the bottom cover 80. Thus, the holding member 12 has four restriction portions 122 in total. The restriction portions 122 restrict movement of the biasing portions 111 in a release direction F2 (see FIG. 3), which is the opposite direction of the biasing direction F1 (see FIG. 3). The restriction portions 122 are provided as a pair corresponding to the pair of biasing portions 111, respectively, for each of the pressure members 11. The restriction portions 122 contact the biasing portions 111 of the pressure members 11 and restrict the movement of the biasing portions 111 in the release direction F2. The restriction relative to the biasing portions 111 is released by moving the biasing portions 111 that are contacting the restriction portions 122 in restriction release directions F3 (see FIG. 5), which are different from the biasing direction F1 and the release direction F2. It is configured such that the pressure members 11 can be moved in the release direction F2 by moving the biasing portions 111 in the restriction release directions F3, respectively. In the illustrated embodiment, the restriction portions 122 are each formed as a triangular prism. Specifically, the restriction portions 122 each have an end surface that faces toward the storage device 2 and a slope surface that extends from an edge of the end surface to outwardly diverge relative to a center axis of the storage device 2 extending along the X direction as moving away from the storage device 2. With this configuration, the biasing portions 111 of the pressure members 11 contact the end surfaces of the restriction portions 122 when the pressure members 11 are located at the biasing position (see FIG. 6).

As shown in FIG. 5, the engagement portions 123 are engaged with end portions 11a of the pressure members 11 so that the pressure members 11 are movable in the biasing direction F1 and the release direction F2. The engagement portions 123 have a pair of insertion holes 123a that are provided corresponding to each of the pressure members 11. The insertion holes 123a are formed in an axial direction along a rotational axis of the pair of torsion coil spring parts 111a of each of the pressure members 11. One ends of the torsion coil spring parts 111a, which form the one end portions 11a of the pressure members 11, are inserted into the insertion holes 123a of the engagement portions 123, respectively. With this configuration, the pressure members 11 are engaged with the engagement portions 123 in a rotatable manner around the axial direction. Specifically, in the illustrated embodiment, the one end portions 11a of each of the pressure members 11 are aligned in the axial direction (the Y direction) while the one end portions 11a are engaged with the engagement portions 123, and define a rotational center of each of the pressure members 11. With this configuration, when the biasing portions 111 are moved from the biasing position in the restriction release directions F3 along the end surfaces of the restriction portions 122 and the biasing portions 111 are disengaged from the end surfaces of the restriction portions 122, the pressure members 11 become rotatable in the release direction F2 toward the pressure release position P.

As shown in FIG. 5, the engagement release restriction portions 124 are provided corresponding to each of the pressure members 11 as a pair of convex portions having a shape that is convex toward the rear cover 70 in the bottom cover 80. The engagement release restriction portions 124 restrict the movement of the pressure members 11 in engagement release directions F4 in which the engagement of the pressure members 11 with the engagement portions 123 is released. The engagement release restriction portions 124 are provided as a pair corresponding to the pair of biasing portions 111, respectively, for each of the pressure members 11. The engagement release restriction portions 124 restrict the movement of the pressure members 11 in the engagement release directions F4 by contacting the biasing portions 111 of the pressure members 11. A state in which the engagement between the pressure members 11 and the engagement portions 123 is released is referred to as an engagement release state, and is a state in which the end portions 11a of the torsion coil spring parts 111a are detached from the insertion holes 123a of the engagement portions 123, respectively. In other words, it is a state in which the pressure members 11 are detached from the attachment and detachment structure 1 of the storage device 2. In order to prevent such engagement release state from occurring, the engagement release restriction portions 124 restrict the movement of the pressure members 11 in the engagement release directions F4. In the illustrated embodiment, the engagement release restriction portions 124 are each formed as a cuboid. Specifically, the engagement release restriction portions 124 are disposed adjacent to the restriction portions 122, respectively, such that the engagement release restriction portions 124 are connected to the restriction portions 122, respectively. The engagement release restriction portions 124 each have an end surface that faces inward toward the center axis of the storage device 2 and extends from an edge of the end surface of the adjacent one of the restriction portions 122 in the X direction. With this configuration, the biasing portions 111 of the pressure members 11 contact the end surfaces of the engagement release restriction portions 124 when the pressure members 11 are located at the biasing position (see FIG. 6).

As shown in FIGS. 2 and 3, the shaft portions 125 have a cylindrical shape that extends toward the rear cover 70 in the bottom cover 80. The shaft portions 125 are formed in the four corners of the mounting portion 121 at positions corresponding to the holes formed in the four corners of the plate member 21 of the storage device 2, respectively. The shaft portions 125 are inserted into the holes of the plate member 21 of the storage device 2, respectively.

The first buffer members 13 are disposed between the holding member 12 and the storage device 2. The first buffer members 13 have through holes (not shown) through which the shaft portions 125 can be inserted. The first buffer members 13 each have a holding member side buffer member 13a that contacts the holding member 12, and a back surface side buffer member 13b formed on an opposite side of the holding member 12 side of the holding member side buffer member 13a. The first buffer members 13 sandwich the plate member 21 of the storage device 2 by the holding member side buffer member 13a and the back side buffer member 13b. The first buffer member 13 is made of silicone resin, for example.

(Attachment and Detachment Method of Storage Device)

Referring to FIG. 6, an attachment and detachment method of the storage device 2 according to the first embodiment will be explained.

First, a detachment method of the storage device 2 will be explained. FIG. 6 is a partial perspective view illustrating the attachment state in which the storage device 2 is pressed and fixed to the holding member 12 by the pressure members 11. As shown in FIG. 6, the storage device 2 is held by the mounting portion 121 of the holding member 12. The plate member 21 of the storage device 2 is sandwiched by the first buffer members 13. The holes in the plate member 21 of the storage device 2 are inserted by the shaft portions 125 of the holding member 12. The pressure members 11 are located at the biasing position, and the contacting portions 112 of the pressure members 11 contact the plate member 21 of the storage device 2 and presses the storage device 2 toward the holding member 12.

When the pressure members 11 are located at the biasing position (see FIG. 6), the biasing portions 111 (the torsion coil spring parts 111a) of the pressure members 11 generate the biasing force. In particular, the biasing portions 111 of the pressure members 11 are twisted about center axes of the torsion coil spring parts 111a to exert the biasing force since the contacting portions 122 contact the plate member 21 of the storage devise 2 while the biasing portions 111 contact the restriction portions 122. Thus, an angle between end portions of the torsion cols spring parts 111a about the center axes of the torsion coil spring parts 111a becomes larger when the pressure members 11 are located at the biasing position (see FIG. 6) than when the pressure members 11 are located at the pressure release position P (see FIG. 7) or the pressure members 11 are in a free state (without any load being applied to them, as shown in FIG. 4). Furthermore, when the pressure members 11 are located at the biasing position (see FIG. 6), the biasing portions 111 of the pressure members 11 contact the end surfaces of the engagement release restriction portions 124. In particular, the width between the end surfaces of the engagement release restriction portions 124 in the Y direction is smaller than the outer width between the biasing portions 111 (the torsion coil spring parts 111a) of the pressure members 11 when the pressure members 11 are located at the pressure release position P (see FIG. 7) or the pressure members 11 are in the free state. Thus, when the pressure members 11 are located at the biasing position (see FIG. 6), the pressure members 11 exert expanding force that outwardly pushes the end surfaces of the engagement release restriction portions 124 by the biasing portions 111.

A user who is replacing the storage device 2 moves the pressure members 11 from the biasing position to the pressure release position P one by one or at the same time to release the pressure relative to the storage device 2. Here, the operation of one of the pressure members 11 will be explained. Since the operation relative to the other one of the pressure members 11 is the same as the operation relative to the one of the pressure members 11, detail description will be omitted for the sake of brevity.

Figure 7:
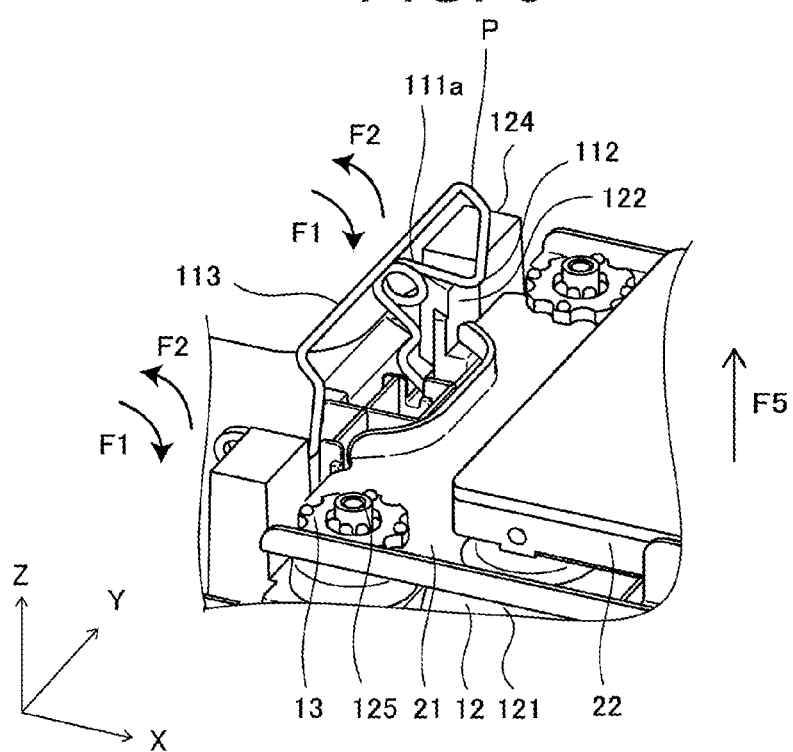
FIG. 7 is a partial perspective view of the attachment and detachment structure in accordance with the first embodiment, illustrating a state in which the pressure member has been moved to a pressure release position.

First, the pair of torsion coil spring parts 111a of the pressure member 11 is moved in the restriction release directions F3, respectively, to release the movement restriction by the restriction portions 122 relative to the torsion coil spring parts 111a. The restriction release directions F3 in this embodiment are directions in which the torsion coil spring parts 111a of the pressure member 11 approach relative to each other, as shown in FIGS. 5 and 6. By moving the torsion coil spring parts 111a of the pressure member 11 in the restriction release directions F3, respectively, the contact state between the torsion coil spring parts 111a and the restriction portions 122 is released. This allows the pressure member 11 to move in the release direction F2. While moving the pressure member 11 in the release direction F2, the contacting portions 112 also rotate in the release direction F2 around the axial direction of the torsion coil spring parts 111a. As a result, the pressure member 11 moves to the pressure release position P as shown in FIG. 7, which is the position in which a pressing state by the pressure member 11 relative to the storage device 2 is released and in which the pressure member 11 and the storage device 2 do not interfere with each other when the storage device 2 is removed from the shaft portions 125 of the holding member 12. As a result, since the first buffer members 13 and the storage device 2 become removable from the shaft portions 125 of the holding member 12, the user can move the storage device 2 in a detachment direction F5 (see FIG. 7) to detach the storage device 2 from the holding member 12. Here, if the torsion coil spring parts 111a are not moved in the restriction release directions F3 in the pressing state by the pressure member 11 relative to the storage device 2 shown in FIG. 6, the contact state between the torsion coil spring parts 111a and the restriction portions 122 is not released, and thus the pressure member 11 cannot move in the release direction F2. Therefore, the pressing state by the pressure member 11 relative to the storage device 2 is not released and is maintained.

Next, an attachment method of the storage device 2 will be explained. In a state in which the pressure members 11 are positioned in the pressure release position P, as shown in FIG. 7, and the storage device 2 is not attached, the shaft portions 125 of the holding member 12 are inserted into the through holes of the first buffer members 13 that are sandwiching the plate member 21 of the storage device 2, and the storage device 2 is moved in the opposite direction of the detachment direction F5. Then, the pressure members 11 are moved back in the biasing direction F1 one by one or at the same time to apply the pressure relative to the storage device 2. Here, the operation of one of the pressure members 11 will be explained. Since the operation relative to the other one of the pressure members 11 is the same as the operation relative to the one of the pressure members 11, detail description will be omitted for the sake of brevity.

By moving the pressure member 11 in the biasing direction F1, the contacting portions 112 are rotated in the biasing direction F1 around the axial direction of the torsion coil spring parts 111a by the biasing force. As a result, the pressure member 11 contacts the plate member 21 of the storage device 2 and presses the storage device 2 toward the holding member 12. The user makes the torsion coil spring parts 111a contact the restriction portions 122, respectively, and restricts the movement of the torsion coil spring parts 111a in the release direction F2 by the restriction portions 122. As a result, the user can attach the storage device 2 to the holding member 12. When the pressure member 11 is moved in the biasing direction F1 from the pressure release position P (see FIG. 7) to the biasing position (see FIG. 6), the biasing portions 111 (the torsion coil spring parts 111a) are guided by and slide on the slope surfaces of the restriction portions 122 such that the pressure member 11 gradually contracts such that the biasing portions 111 approach relative to each other. Once the biasing portions 111 climb over the slope surfaces of the restriction portions 122, the pressure member 11 expands such that the biasing portions 111 move away from each other and contact the end surfaces of the engagement release restriction portions 124.

When the pressure members 11 are removed from the holding member 12, first the pressure members 11 are moved to an engagement release position which is located beyond the pressure release position P in the release direction F2, for example. When the pressure members 11 are located at the engagement release position, the movement of the biasing portions 111 in the engagement release directions F4 is not restricted by the restriction portions 112 or the engagement release restriction portions 124. Thus, the biasing portions 111 can be moved in the engagement release directions F4 such that the engagement between the end portions 11a of the pressure members 11 and the insertion holes 123a of the engagement portions 123 are released to remove the pressure members 11 from the holding member 12.

Effect of First Embodiment

In the first embodiment, as described above, the pressure members 11 are configured to contact the storage device 2 and include the biasing portions 111 to press the storage device 2 in the biasing direction F1 toward the holding member 12 are movable to the pressure release position P in which the pressure members 11 are separated from the storage device 2 in the opposite direction of the biasing direction F1 to release the pressure relative to the storage device 2. With this configuration, for example, the storage device 2 can be pressed and fixed relative to the holding member 12 without using a screw member, and pressing and fixing of the storage device 2 relative to the holding member 12 can be released by moving the pressure members 11 to the pressure release position P by separating the pressure members 11 from the storage device 2 in the opposite direction of the biasing direction F1. With this configuration, since the work to use a screwdriver or other tool to remove and tighten screw members can be made unnecessary when replacing the storage device 2, the time and labor required for the replacement work can be reduced. In addition, since there is no need for a separate member from the pressure members 11 to detach the storage device 2 for replacement of the storage device 2, the increase in the number of parts can be suppressed. As a result, the time and labor required for replacement of the storage device 2 can be reduced, and the increase in the number of parts can be suppressed. Furthermore, this also eliminates the need to replace the parts including the holding member 12 due to stripping of a screw head groove of the screw member.

In the first embodiment, as described above, the pressure members 11 include the contacting portions 112 that are configured to contact the storage device 2 to press the storage device 2 toward the holding member 12, and the torsion coil spring parts 111a that are configured to provide the biasing force to bias the contacting portions 112 toward the holding member 12. With this configuration, an appropriate load can be applied to the storage device 2 and the contact area to the storage device 2 can be suppressed. Therefore, it is possible to both prevent the storage device 2 from falling out of the holding member 12 and suppress the transmission of vibration from the display device 100 to the storage device 2.

In the first embodiment, as described above, the pressure members 11 each include the pair of contacting portions 112 that are configured to contact the storage device 2 to press the storage device 2 toward the holding member 12, the pair of torsion coil spring parts 111a that are configured to provide the biasing force to bias the pair of contacting portions 112, and the connecting portion 113 that connects the pair of contacting portions 112 relative to each other. With this configuration. With this configuration, it is possible to apply a more appropriate load to the storage device 2 and to reduce the increase in the number of parts.

In the first embodiment, as described above, the holding member 12 includes the restriction portions 122 that are configured to restrict movement of the biasing portions 111 in the release direction F2 for releasing the pressure relative to the storage device 2, the release direction F2 is the opposite direction of the biasing direction F1. With this configuration, it is possible to prevent the biasing portions 111 from moving in the release direction F2 while biasing the storage device 2. As a result, it is possible to prevent unintentional release of the biasing by the biasing portions 111.

In the first embodiment, as described above, the pressure members 11 are movable in the release direction F2 while restriction by the restriction portions 122 relative to the biasing portions 111 being released by moving the biasing portions 111 in the restriction release directions F3 that are different from the biasing direction F1 and the release direction F2. With this configuration, it is possible to prevent the unintended movement of the biasing portions 111 in the release direction F2 and to easily release the movement restriction by the restriction portions 122 relative to the biasing portions 111.

In the first embodiment, as described above, the holding member 12 further includes the engagement portions 123 that engage with the end portions 11a of the pressure members 11 such that the pressure members 11 are movable in the biasing direction F1 and the release direction F2, and the engagement release restriction portions 124 that are configured to restrict movement of the pressure members 11 in the engagement release directions F4 for releasing the engagement of the pressure members 11 with the engagement portions 123. With this configuration, unintentional release of the engagement between the pressure members 11 and the holding member 12 can be further suppressed.

In the first embodiment, as described above, the storage device attachment and detachment structure 1 further comprises the first buffer members 13 disposed between the holding member 12 and the storage device 2, the first buffer members 13 having the through holes, the holding member 12 further having the shaft portions 125 that are inserted through the through holes of the first buffer members 13 and the holes formed in the plate member 21 to which the storage medium 22 of the storage device 2 is attached, and the first buffer members 113 and the storage device 2 becoming removable from the shaft portions 125 by the biasing portions 111 moving in the restriction release directions F3 and the pressure members 11 moving to the pressure release position P. With this configuration, since the storage device 2 can be easily replaced, the time and labor required for replacement work can be further reduced. In addition, since the first buffer members 13 are further comprised, the transmission of vibration from the display device 100 to the storage device 2 can be further suppressed.

In the first embodiment, as described above, the pressure members 11 are configured to contact the plate member 21 to which the storage medium 22 of the storage device 2 is attached to press the plate member 21 toward the holding member 12. With this configuration, the storage device 2 can be properly pressed via the plate member 21.

Second Embodiment

Figure 8:
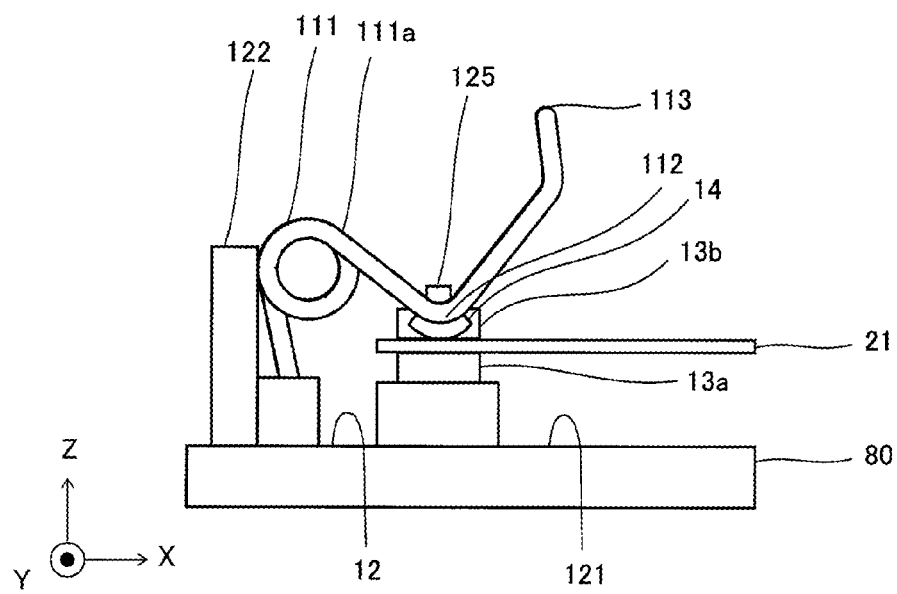
FIG. 8 is a side schematic view of a pressure member of an attachment and detachment structure in accordance with a second embodiment.

Referring to FIG. 8, the configuration of the display device 100 including the attachment and detachment structure 1 of the storage device 2 according to a second embodiment will be described. In view of the similarity between the first and second embodiments, the parts of the second embodiment that are similar or identical to the parts of the first embodiment will be given the same reference numerals as the parts of the first embodiment. Moreover, the descriptions of the parts of the second embodiment that are similar or identical to the parts of the first embodiment may be omitted for the sake of brevity.

In the second embodiment, unlike the first embodiment in which the contacting portions 112 directly contact the storage device 2, second buffer members 14 are provided at portions of the contacting portions 112 that contact or press the storage device 2 (the plate member of the storage device), respectively. The second buffer members 14 are made of ethylene vinyl acetate copolymer (EVA), for example.

The other configuration of the second embodiment is the same as the first embodiment above.

Effect of Second Embodiment

In the second embodiment, as described above, the second buffer members 14 are provided at the portions of the contacting portions 112 that contact or press the storage device 2, respectively. With this configuration, the transmission of vibration from the display device 100 to the storage device 2 can be more appropriately suppressed.

The other effects of the second embodiment are the same as the first embodiment.

Third Embodiment

Figure 9:
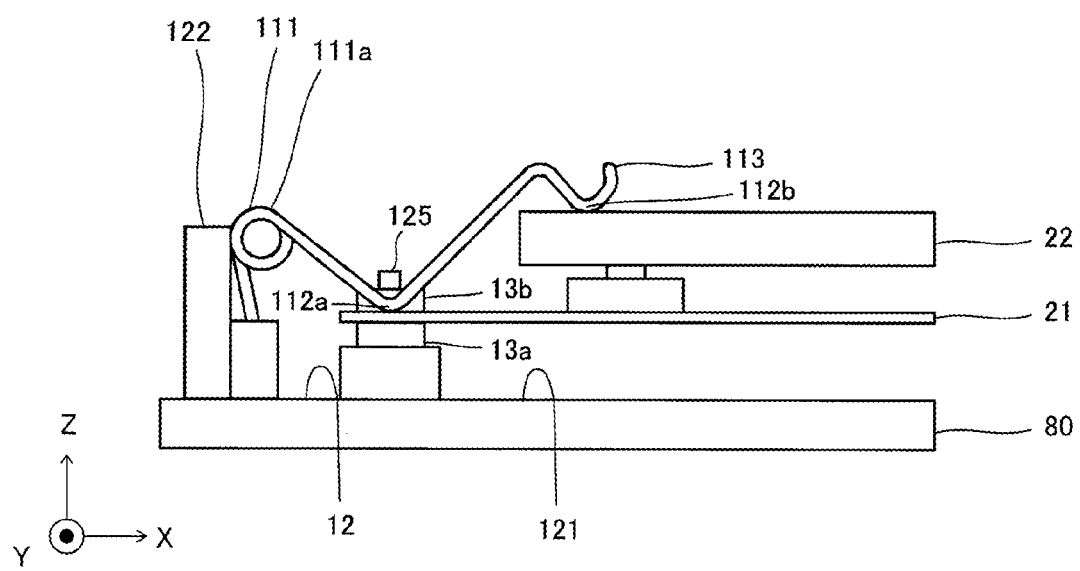
FIG. 9 is a side schematic view of a pressure member of an attachment and detachment structure in accordance with a third embodiment.

Referring to FIG. 9, the configuration of the display device 100 including the attachment and detachment structure 1 of the storage device 2 according to a third embodiment will be described. In view of the similarity between the first and third embodiments, the parts of the third embodiment that are similar or identical to the parts of the first embodiment will be given the same reference numerals as the parts of the first embodiment. Moreover, the descriptions of the parts of the third embodiment that are similar or identical to the parts of the first embodiment may be omitted for the sake of brevity.

In the third embodiment, unlike the first embodiment in which the contacting portions 112 contact the plate member 21 of the storage device 2 and presses the plate member 21 of the storage device 2 toward the holding member 12, the contacting portions 112 are configured to contact both the plate member 21 of the storage device 2 and the storage medium 22 of the storage device 2 and press the storage device 2 (the plate member 21 and the storage medium 22) toward the holding member 12. The contacting portions 112 each includes a first contacting portion 112a that contacts the plate member 21 of the storage device 2 and a second contacting portion 112b that contacts the storage medium 22 of the storage device 2. Specifically, the first contacting portion 112a and the second contacting portion 112b are spaced apart from each other such that the first contacting portion 112a and the second contacting portion 112b contact the storage device 2 at different locations spaced apart from each other. In the illustrated embodiment, as shown in FIG. 9, the first contacting portion 112a is located between the biasing portion 111 and the second contacting portion 112b along a wire forming the pressure member 11. The first contacting portion 112a and the second contacting portion 112b have a U-shaped bend shape that is convex toward the holding member 12, for example. Portions of the storage medium 22 on an opposite surface of a surface of the storage medium 22 on the plate member 21 side, at which the second contacting portions 112b contact the storage medium 22 are not particularly limited. As in the first embodiment above (see FIG. 2), in the third embodiment, the pressure members 11 are formed near both end portions of the mounting portion 121 of the holding member 12 in the X direction, respectively. The length from the torsion coil spring part 111a to the second contacting portion 112b in one of these pressure members 11 may be different from the length from the torsion coil spring part 111a to the second contacting portion 112b in the other one of the pressure member 11. In other words, the lengths from the torsion coil spring parts 111a to the second contacting portions 112b of the two pressure members 11 formed near both end portions of the mounting portion 121 in the X direction are respectively formed to an appropriate length capable of appropriately pressing the storage device 2 via the plate member 21 and the storage medium 22.

The other configuration of the third embodiment is the same as the first embodiment above.

Effect of Third Embodiment

In the third embodiment, as described above, the contacting portions 112 are configured to contact the plate member 21 to which the storage medium 22 of the storage device 2 is attached and the storage medium 22 of the storage device 2 and press the plate member 21 and the storage medium 22 toward the holding member 12. With this configuration, the storage device 2 can be pressed more appropriately via the plate member 21 and the storage medium 22.

The other effects of the third embodiment are the same as the first embodiment.

Modification Example

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalents.

For example, in the first to third embodiments above, an example of the display device 100 equipped with the display 50 and the attachment and detachment structure 1 of the storage device 2 (an attachment section to which the storage device 2 is attachably and detachably attached) is shown, but the present invention is not limited to this. For example, the attachment and detachment structure of the storage device can be provided in televisions, laptop personal computers, desktop personal computers, tablet terminals, and gaming devices.

In the first to third embodiments above, an example is shown in which the pressure members 11 have the torsion coil spring parts 111a, but the present invention is not limited to this. The pressure members can have spring parts each formed by a plate or leaf spring part or other spring shape, as long as the pressure members can bias the storage device in the biasing direction F1 and are movable in the release direction F2.

In the first to third embodiments above, an example is shown in which the pressure members 11 each having the pair of torsion coil spring parts 111a are formed near both end portions of the mounting portion 121 of the holding member 12 in the X direction, respectively, but the present invention is not limited to this. The pressure members can be formed near only one end portion of the mounting portion 121 of the holding member 12 in the X direction, or near both end portions of the holding member 12 in the Y direction.

In the first to third embodiments above, an example is shown in which the first buffer members 13 are made of silicone resin and the second buffer members 14 are made of ethylene vinyl acetate copolymer, but the present invention is not limited to this. The materials of the first and second buffer members are not particularly limited, as long as the first and second buffer members can adequately suppress the transmission of vibration from the display device 100.

Figure 10:
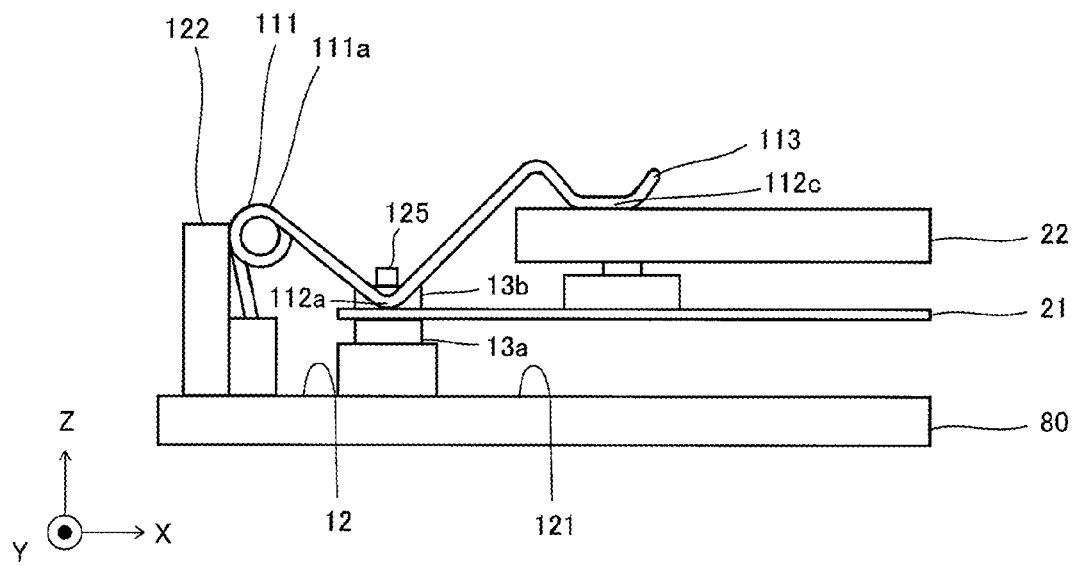
FIG. 10 is a side schematic view of a pressure member of an attachment and detachment structure in accordance with a modification example.

In the third embodiment above, an example is shown in which the second contacting portions 112b have a U-shaped bend shape that is convex toward the holding member 12, but the present invention is not limited to this. As shown in FIG. 10, for example, the contacting portions 112 can each include a second contacting portion 112c having a shape that is convex toward the holding member 12 and has an extended portion that extends along a contacting or upper surface of the storage medium 22 and makes linear contact with the contacting surface of the storage medium 22. In this case, as in the third embodiment above, the lengths from the torsion coil spring parts 111a to the second contacting portions 112c of the two pressure members 11 formed near both end portions of the mounting portion 121 in the X direction are respectively formed to an appropriate length capable of appropriately pressing the storage device 2 via the plate member 21 and the storage medium 22.

Figure 11:
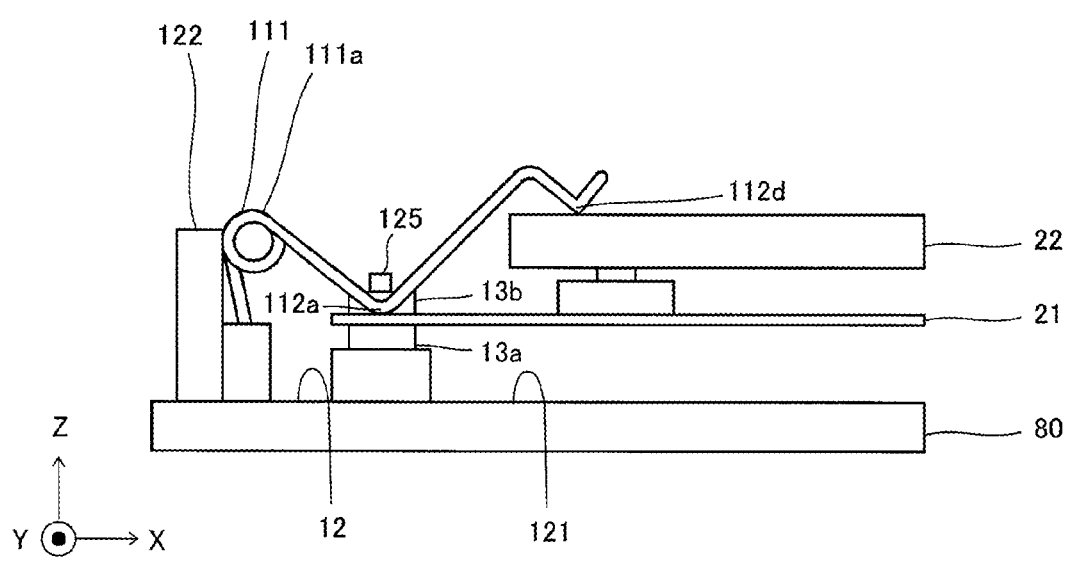
FIG. 11 is a side schematic view of a pressure member of an attachment and detachment structure in accordance with another modification example.

Furthermore, in the third embodiment above, an example is shown in which the pressure members 11 each include the connecting portion 113 and the second contacting portions 112b have a U-shaped bend shape that is convex toward the holding member 12, but the present invention is not limited to this. As shown in FIG. 11, for example, the pressure members 11 can be formed such that the pressure members 11 do not include the connecting portions 113 and the contacting portions 112 each include a second contacting portion 112d having a V-shaped bend shape that is convex toward the holding member 12. In this case, as in the third embodiment above, the lengths from the torsion coil spring parts 111a to the second contacting portions 112d of the two pressure members 11 formed near both end portions of the mounting portion 121 in the X direction are respectively formed to an appropriate length capable of appropriately pressing the storage device 2 via the plate member 21 and the storage medium 22.

(1) In view of the state of the known technology and in accordance with a first aspect of the present invention, a storage device attachment and detachment structure comprises a holding member configured to hold a storage device with a storage medium, and a pressure member including a biasing portion that has an end portion connected to the holding member, the pressure member being configured to contact the storage device to press the storage device in a biasing direction toward the holding member, the pressure member being movable to a pressure release position in which the pressure member is separated from the storage device in an opposite direction of the biasing direction to release pressure relative to the storage device.

In the storage device attachment and detachment structure according to the first aspect, as described above, the pressure member that is configured to contact the storage device and includes the biasing portion to press the storage device in the biasing direction toward the holding member is movable to the pressure release position in which the pressure member is separated from the storage device in the opposite direction of the biasing direction to release pressure relative to the storage device. With this configuration, for example, the storage device can be pressed and fixed relative to the holding member without using a screw member, and pressing and fixing of the storage device relative to the holding member can be released by moving the pressure member to the pressure release position by separating the pressure member from the storage device in the opposite direction of the biasing direction. With this configuration, since the work to use a screwdriver or other tool to remove and tighten screw members can be made unnecessary when replacing the storage device, the time and labor required for the replacement work can be reduced. In addition, since there is no need for a separate member from the pressure member to detach the storage device for replacement of the storage device, the increase in the number of parts can be suppressed. As a result, the time and labor required for the replacement work of the storage device can be reduced, and the increase in the number of parts can be suppressed. Furthermore, this also eliminates the need to replace the parts including the holding member due to the stripping of a screw head groove of the screw member.

(2) In accordance with a preferred embodiment according to the storage device attachment and detachment structure mentioned above, the pressure member includes a contacting portion that is configured to contact the storage device to press the storage device toward the holding member, and a torsion coil spring part that is configured to provide biasing force to bias the contacting portion toward the holding member. With this configuration, an appropriate load can be applied to the storage device and the contact area to the storage device can be suppressed. Therefore, it is possible to both prevent the storage device from falling out of the holding member and suppress the transmission of vibration from a device including the holding member to the storage device.

(3) In accordance with a preferred embodiment according to any one of the storage device attachment and detachment structures mentioned above, the pressure member includes a pair of contacting portions that are configured to contact the storage device to press the storage device toward the holding member, a pair of torsion coil spring parts that are configured to provide biasing force to bias the pair of the contacting portions, and a connecting portion that connects the pair of the contacting portions relative to each other. With this configuration, it is possible to apply a more appropriate load to the storage device and to reduce the increase in the number of parts.

(4) In accordance with a preferred embodiment according to any one of the storage device attachment and detachment structures mentioned above, the holding member includes a restriction portion that is configured to restrict movement of the biasing portion in a release direction for releasing the pressure relative to the storage device, the release direction being the opposite direction of the biasing direction. With this configuration, since it is possible to prevent the biasing portion from moving in the release direction while biasing the storage device, it is possible to prevent unintentional release of the biasing by the biasing portion.

(5) In accordance with a preferred embodiment according to any one of the storage device attachment and detachment structures mentioned above, the pressure member is movable in the release direction while restriction by the restriction portion relative to the biasing portion being released by moving the biasing portion in a restriction release direction that is different from the biasing direction and the release direction. With this configuration, it is possible to prevent the unintended movement of the biasing portion in the release direction and to easily release the movement restriction by the restriction portion relative to the biasing portion.

(6) In accordance with a preferred embodiment according to any one of the storage device attachment and detachment structures mentioned above, the holding member further includes an engagement portion that engages with an end portion of the pressure member such that the pressure member is movable in the biasing direction and the release direction, and an engagement release restriction portion that is configured to restrict movement of the pressure member in an engagement release direction for releasing engagement of the pressure member with the engagement portion. With this configuration, unintentional release of the engagement between the pressure member and the holding member can be further suppressed.

(7) In accordance with a preferred embodiment according to any one of the storage device attachment and detachment structures mentioned above, the storage device attachment and detachment structure further comprises a first buffer member disposed between the holding member and the storage device, the first buffer member having a through hole, the holding member further having a shaft portion that is inserted through the through hole of the first buffer member and a hole or cutout formed in a plate member to which the storage medium of the storage device is attached, and the first buffer member and the storage device becoming removable from the shaft portion by the biasing portion moving in the restriction release direction and the pressure member moving to the pressure release position. With this configuration, since the storage device can be easily replaced, the time and labor required for replacement work can be further reduced. In addition, since the first buffer member is further comprised, the transmission of vibration from the device including the holding member to the storage device can be further suppressed.

(8) In accordance with a preferred embodiment according to any one of the storage device attachment and detachment structures mentioned above, the pressure member is configured to contact a plate member to which the storage medium of the storage device is attached to press the plate member toward the holding member. With this configuration, the storage device can be properly pressed via the plate member.

(9) In accordance with a preferred embodiment according to any one of the storage device attachment and detachment structures mentioned above, the pressure member is configured to contact a plate member to which the storage medium of the storage device is attached and the storage medium of the storage device to press the storage device toward the holding member. With this configuration, the storage device can be pressed more appropriately via the plate member and the storage medium.

(10) In accordance with a preferred embodiment according to any one of the storage device attachment and detachment structures mentioned above, the storage device attachment and detachment structure further comprises a second buffer member disposed at a portion of the pressure member that is configured to contact the storage device. With this configuration, the transmission of vibration from the device including the holding member to the storage device can be more appropriately suppressed.

(11) In accordance with a preferred embodiment according to any one of the storage device attachment and detachment structures mentioned above, the storage device attachment and detachment structure further comprises an additional pressure member including a biasing portion that has an end portion connected to the holding member, the additional pressure member being configured to contact the storage device to press the storage device in the biasing direction toward the holding member.

(12) In accordance with a preferred embodiment according to any one of the storage device attachment and detachment structures mentioned above, the pressure member is made of a metal wire and is integrally formed as a one-piece, unitary member.

(13) In accordance with a preferred embodiment according to any one of the storage device attachment and detachment structures mentioned above, the contacting portion includes a first contacting portion and a second contacting portion that contact the storage device at different locations spaced apart from each other, respectively.

(14) In accordance with a preferred embodiment according to any one of the storage device attachment and detachment structures mentioned above, the first contacting portion is configured to contact a plate member to which the storage medium of the storage device is attached, and the second contacting portion is configured to contact the storage medium of the storage device.

(15) In view of the state of the known technology and in accordance with a second aspect of the present invention, a display device comprises a display, and an attachment section to which a storage device with a storage medium is attachably and detachably attached, the attachment section including a holding member that is configured to hold the storage device and a pressure member that includes a biasing portion that has an end portion connected to the holding member, the pressure member being configured to contact the storage device to press the storage device in a biasing direction toward the holding member, the pressure member being movable to a pressure release position in which the pressure member is separated from the storage device in an opposite direction of the biasing direction to release pressure relative to the storage device.

In the display device according to the second aspect, as described above, the pressure member that is configured to contact the storage device and includes the biasing portion to press the storage device in the biasing direction toward the holding member is movable to the pressure release position in which the pressure member is separated from the storage device in the opposite direction of the biasing direction to release pressure relative to the storage device. With this configuration, for example, the storage device can be pressed and fixed relative to the holding member without using a screw member, and pressing and fixing of the storage device relative to the holding member can be released by moving the pressure member to the pressure release position by separating the pressure member from the storage device in the opposite direction of the biasing direction. With this configuration, since the work to use a screwdriver or other tool to remove and tighten screw members can be made unnecessary when replacing the storage device, the time and labor required for the replacement work can be reduced. In addition, since there is no need for a separate member from the pressure member to detach the storage device for replacement of the storage device, the increase in the number of parts can be suppressed. As a result, the time and labor required for the replacement work of the storage device can be reduced, and the increase in the number of parts can be suppressed. Furthermore, this also eliminates the need to replace the parts including the holding member due to the stripping of a screw head groove of the screw member.

(16) In accordance with a preferred embodiment according to any one of the storage device attachment and detachment structures mentioned above, the pressure member is configured to release the pressure relative to the storage device by being toollessly moved from a biasing position in which the pressure member contacts the storage device to the pressure release position.

(17) In accordance with a preferred embodiment according to any one of the storage device attachment and detachment structures mentioned above, the restriction portion of the holding member has an end surface that contacts the biasing portion to restrict the movement of the biasing portion in the release direction while the pressure member contacts the storage device.

(18) In accordance with a preferred embodiment according to any one of the storage device attachment and detachment structures mentioned above, the engagement portion of the holding member has a through hole into which the end portion of the pressure member is inserted.

(19) In accordance with a preferred embodiment according to any one of the storage device attachment and detachment structures mentioned above, the engagement release restriction portion of the holding member has an end face that contacts the biasing portion to restrict the movement of the biasing portion in the engagement release direction while the pressure member contacts the storage device.

(20) In accordance with a preferred embodiment according to any one of the storage device attachment and detachment structures mentioned above, the engagement release direction is an opposite direction of the restriction release direction.

According to the present invention, as described above, it is possible to provide a storage device attachment and detachment structure and a display device that can reduce the time and labor required for replacing a storage device, and that can suppress the increase in the number of parts.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position. The terms "left" and "right" are used to indicate the "right" when referencing from the right side as viewed from the front of the display device, and the "left" when referencing from the left side as viewed from the front of the display device.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A storage device attachment and detachment structure comprising:
   a holding member configured to hold a storage device with a storage medium; and
   a pressure member including a biasing portion that has an end portion connected to the holding member, the pressure member being configured to contact the storage device to press the storage device in a biasing direction toward the holding member, the pressure member being made of a metal wire and being integrally formed as a one-piece, unitary member,
   the pressure member being movable to a pressure release position in which the pressure member is separated from the storage device in an opposite direction of the biasing direction to release pressure relative to the storage device,
   the pressure member including at least one contacting portion that is configured to contact the storage device to press the storage device toward the holding member, and at least one torsion coil spring part that is configured to provide biasing force to bias the contacting portion toward the holding member, and
   the at least one torsion coil spring part of the pressure member being pivotable relative to the holding member to the pressure release position about a pivot center axis defined by and located on the end portion connected to the holding member.

2. The storage device attachment and detachment structure according to claim 1, wherein
   the at least one contacting portion includes a pair of contacting portions that are configured to contact the storage device to press the storage device toward the holding member,
   the at least one torsion coil spring part includes a pair of torsion coil spring parts that are configured to provide biasing force to bias the pair of the contacting portions, and
   the pressure member includes a connecting portion that connects the pair of the contacting portions relative to each other.

3. The storage device attachment and detachment structure according to claim 1, wherein
   the holding member includes a restriction portion that is configured to restrict movement of the biasing portion in a release direction for releasing the pressure relative to the storage device, the release direction being the opposite direction of the biasing direction.

4. The storage device attachment and detachment structure according to claim 3, wherein
   the pressure member is movable in the release direction while restriction by the restriction portion relative to the biasing portion being released by moving the biasing portion in a restriction release direction that is different from the biasing direction and the release direction.

5. The storage device attachment and detachment structure according to claim 4, wherein
   the holding member further includes an engagement portion that engages with the end portion of the pressure member such that the pressure member is movable in the biasing direction and the release direction, and an engagement release restriction portion that is configured to restrict movement of the pressure member in an engagement release direction for releasing engagement of the pressure member with the engagement portion.

6. The storage device attachment and detachment structure according to claim 5, further comprising
   a first buffer member disposed between the holding member and the storage device, the first buffer member having a through hole,
   the holding member further having a shaft portion that is inserted through the through hole of the first buffer member and a hole or cutout formed in a plate member to which the storage medium of the storage device is attached, and
   the first buffer member and the storage device becoming removable from the shaft portion by the biasing portion moving in the restriction release direction and the pressure member moving to the pressure release position.

7. The storage device attachment and detachment structure according to claim 5, wherein
   the engagement portion of the holding member has a through hole into which the end portion of the pressure member is inserted.

8. The storage device attachment and detachment structure according to claim 5, wherein
   the engagement release restriction portion of the holding member has an end face that contacts the biasing portion to restrict the movement of the biasing portion in the engagement release direction while the pressure member contacts the storage device.

9. The storage device attachment and detachment structure according to claim 5, wherein
   the engagement release direction is an opposite direction of the restriction release direction.

10. The storage device attachment and detachment structure according to claim 3, wherein
    the restriction portion of the holding member has an end surface that contacts the biasing portion to restrict the movement of the biasing portion in the release direction while the pressure member contacts the storage device.

11. The storage device attachment and detachment structure according to claim 1, wherein
    the pressure member is configured to contact a plate member to which the storage medium of the storage device is attached to press the plate member toward the holding member.

12. The storage device attachment and detachment structure according to claim 1, wherein the pressure member is configured to contact a plate member to which the storage medium of the storage device is attached and the storage medium of the storage device to press the storage device toward the holding member.

13. The storage device attachment and detachment structure according to claim 1, further comprising
a second buffer member disposed at a portion of the pressure member that is configured to contact the storage device.

14. The storage device attachment and detachment structure according to claim 1, further comprising
an additional pressure member including a biasing portion that has an additional end portion connected to the holding member, the additional pressure member being configured to contact the storage device to press the storage device in the biasing direction toward the holding member.

15. The storage device attachment and detachment structure according to claim 1, wherein
the at least one contacting portion includes a first contacting portion and a second contacting portion that contact the storage device at different locations spaced apart from each other, respectively.

16. The storage device attachment and detachment structure according to claim 15, wherein
the first contacting portion is configured to contact a plate member to which the storage medium of the storage device is attached, and
the second contacting portion is configured to contact the storage medium of the storage device.

17. The storage device attachment and detachment structure according to claim 1, wherein
the pressure member is configured to release the pressure relative to the storage device by being toollessly moved from a biasing position in which the pressure member contacts the storage device to the pressure release position.

18. A display device comprising:
a display; and
an attachment section to which a storage device with a storage medium is attachably and detachably attached,
the attachment section including a holding member that is configured to hold the storage device and a pressure member that includes a biasing portion that has an end portion connected to the holding member, the pressure member being configured to contact the storage device to press the storage device in a biasing direction toward the holding member, the pressure member being made of a metal wire and being integrally formed as a one-piece, unitary member,
the pressure member being movable to a pressure release position in which the pressure member is separated from the storage device in an opposite direction of the biasing direction to release pressure relative to the storage device,
the pressure member including at least one contacting portion that is configured to contact the storage device to press the storage device toward the holding member, and at least one torsion coil spring part that is configured to provide biasing force to bias the contacting portion toward the holding member, and
the at least one torsion coil spring part of the pressure member being pivotable relative to the holding member to the pressure release position about a pivot center axis defined by and located on the end portion connected to the holding member.

\* \* \* \* \*